(12) United States Patent
Wallgren et al.

(10) Patent No.: US 7,871,551 B2
(45) Date of Patent: Jan. 18, 2011

(54) SYSTEMS, APPARATUS, AND METHODS TO FEED AND DISTRIBUTE POWDER USED TO PRODUCE THREE-DIMENSIONAL OBJECTS

(75) Inventors: Göran Wallgren, Onsala (SE); Ulf Ackelid, Göteborg (SE); Mattias Svensson, Göteborg (SE)

(73) Assignee: Arcam AB (SE)

( * ) Notice: Subject to any disclaimer, the term of this patent is extended or adjusted under 35 U.S.C. 154(b) by 502 days.

(21) Appl. No.: 11/918,376

(22) PCT Filed: May 11, 2005

(86) PCT No.: PCT/SE2005/000680
§ 371 (c)(1),
(2), (4) Date: Oct. 12, 2007

(87) PCT Pub. No.: WO2006/121374
PCT Pub. Date: Nov. 16, 2006

(65) Prior Publication Data
US 2009/0072450 A1    Mar. 19, 2009

(51) Int. Cl.
B28B 5/00 (2006.01)
B28B 17/00 (2006.01)
B05D 1/00 (2006.01)

(52) U.S. Cl. .................. 264/241; 425/174.4; 425/375; 427/189

(58) Field of Classification Search .......... 427/189; 264/241; 425/375, 174.4
See application file for complete search history.

(56) References Cited
U.S. PATENT DOCUMENTS
4,863,538 A    9/1989  Deckard
5,348,693 A *  9/1994  Taylor et al. ............. 264/401
5,647,931 A    7/1997  Retallick et al.

(Continued)

FOREIGN PATENT DOCUMENTS
JP    2003-245981    9/2003

(Continued)

OTHER PUBLICATIONS

PCT Application No. PCT/SE2005/000680, International Search Report mailed Dec. 19, 2005, 2 pgs.

(Continued)

*Primary Examiner* — Frederick J Parker
(74) *Attorney, Agent, or Firm* — Schwegman, Lundberg & Woessner, P.A.

(57) ABSTRACT

Systems, apparatus, and methods feed and distribute a powder over a working area used for producing three-dimensional objects. A powder storage unit contains a supply of powder, and a distribution member is arranged to be moveable across the working area to distribute a portion of powder onto the working area. In an embodiment, the distribution member is, in a first step, moveable a predetermined distance into a supply of powder placed in the powder storage unit, said distance being sufficiently long to bring about a transfer of a portion of powder from the powder supply at one side of the distribution member to another side of the distribution member facing the working area, and the distribution member is, in a second step, moveable towards and across the working area to distribute the portion of powder onto the working area. Other embodiments are disclosed.

17 Claims, 3 Drawing Sheets

U.S. PATENT DOCUMENTS

| | | | |
|---|---|---|---|
| 5,730,925 A | * | 3/1998 | Mattes et al. ............... 264/497 |
| 7,540,738 B2 | | 6/2009 | Larsson et al. |
| 2004/0084814 A1 | | 5/2004 | Boyd et al. |
| 2004/0170765 A1 | | 9/2004 | Ederer et al. |
| 2007/0245950 A1 | | 10/2007 | Teulet |

FOREIGN PATENT DOCUMENTS

| | | |
|---|---|---|
| SE | 524467 C2 | 8/2004 |
| WO | WO-02/083323 A2 | 10/2002 |
| WO | WO-2004054743 A1 | 7/2004 |
| WO | WO-2005/002764 A1 | 1/2005 |

OTHER PUBLICATIONS

"European Application Serial No. 05748734.0, Communication dated Jun. 25, 2008", 6 pgs.

"European Application Serial No. 05748734.0, Invitation pursuant to Article 94(3) and Rule 71(1) EPC dated Mar. 16, 2009", 8 pgs.

"European Application Serial No. 05748734.0, Response filed Apr. 2, 2009 to Invitation dated Mar. 16, 2009", 5 pgs.

"European Application Serial No. 05748734.0, Response filed Oct. 27, 2008 to Communication dated Jun. 25, 2008", 7 pgs.

"International Application Serial No. PCT/SE2005/000680, Written Opinion mailed Dec. 19, 2005", 4 pgs.

* cited by examiner

SYSTEMS, APPARATUS, AND METHODS TO FEED AND DISTRIBUTE POWDER USED TO PRODUCE THREE-DIMENSIONAL OBJECTS

RELATED APPLICATIONS

This application is a nationalization under 35 U.S.C. 371 of PCT/SE2005/000680, filed May 11, 2005 and published as WO 2006/121374 Al on Nov. 16, 2006; which application and publication are incorporated herein by reference and made a part hereof.

TECHNICAL FIELD

The invention concerns a powder application system for feeding and distributing a powder over a working area in an apparatus for producing three-dimensional objects layer by layer using a powdery material which can be solidified by irradiating it with electromagnetic radiation or an electron beam.

BACKGROUND ART

Equipment for producing a three-dimensional object layer by layer using a powdery material which can be solidified by irradiating it with electromagnetic radiation or an electron beam are known from e.g. U.S. Pat. Nos. 4,863,538, 5,647,931 and SE524467. Such equipment include for instance a supply of powder, means for applying a layer of powder on a working area, and means for directing the beam over the working area. The powder sinters or melts and solidifies as the beam moves over the working area. For product quality reasons it is important that the powder is evenly distributed over the working area and that the layer thickness is well-defined and corresponds to a predetermined value. Further, it is advantageous that the layer is quickly applied in order to keep the production rate as high as possible.

Conventional powder application means generally includes a feeding member and a distribution member where the former transfers a certain quantity of powder from the supply of powder to the distribution member, which in turn distributes the powder over the working area.

The conditions under which the powder application means work are rough; the temperature is high, powder particles find their way into openings and slits, evaporated powder material condensate and form coatings etc. This causes problems in that shafts, hinges and other moveable parts, in particular of the feeding member, stop up resulting in a worsened mechanical functioning. In addition to production interruptions this leads to problems in feeding a correct amount of powder to the distribution member, which in turn leads to an uneven powder distribution.

DISCLOSURE OF INVENTION

An object of the invention is to provide an improved powder application for equipment for producing three-dimensional objects. This objective is achieved by the technical features recited in the claims, including the dependent claims, which contain advantageous embodiments, further developments and variants of the invention.

The invention concerns a powder application system for feeding and distributing a powder over a working area in an apparatus for producing three-dimensional objects, said system comprising a powder storage unit adapted to contain a supply of powder and further comprising a distribution member that is arranged to be moveable across the working area as to distribute a portion of powder onto the working area. The invention is characterized in that the distribution member is arranged to be, in a first step, moveable a predetermined distance into a supply of powder placed in the powder storage unit, said distance being sufficiently long to bring about a transfer of a portion of powder from the powder supply at one side of the distribution member to another side of the distribution member facing the working area, and that the distribution member is arranged to be, in a second step, moveable towards and across the working area as to distribute the portion of powder onto the working area.

Thus, the distribution member according to the invention works both as a feeding member and a distribution member resulting in that no further moving parts are needed for feeding powder to the distribution member. An advantageous effect of this design is that it makes the system mechanically simpler and more reliable than conventional systems.

In a first preferred embodiment of the invention the powder storage unit is arranged in an open manner such that powder placed in the powder storage unit is allowed to form an angle of repose on the side of the powder supply facing the working area. Since such a powder supply provides a well-defined shape that also reforms in a consistent manner this design makes it possible to obtain a well-defined size of the portion of powder by controlling only the movement of the distribution member, i.e. by setting the distance at which the distribution member is to be moved into the powder storage unit, and thus, into the powder supply. This is a simple and reliable way of feeding correct amounts of powder to the distribution member.

The invention also concerns an apparatus for producing a three-dimensional object layer by layer using a powdery material which can be solidified by irradiating it with electromagnetic radiation or an electron beam, characterized in that it comprises the inventive powder application system.

The invention further concerns a method for applying powder onto a working area in an apparatus for producing three-dimensional objects, said method comprising the steps of transferring a portion of powder from a powder supply to a distribution member and moving the distribution member across the working area as to distribute the portion of powder onto the working area. The inventive method is characterized in that it comprises a first step of moving the distribution member a predetermined distance into the powder supply as to bring about a transfer of a portion of powder from the powder supply at one side of the distribution member to another side of the distribution member facing the working area, and a second step of moving the distribution member towards and across the working area as to distribute the portion of powder onto the working area.

BRIEF DESCRIPTION OF DRAWINGS

In the description of the invention given below reference is made to the following figures, in which.

EMBODIMENT(S) OF THE INVENTION

Figure 1:
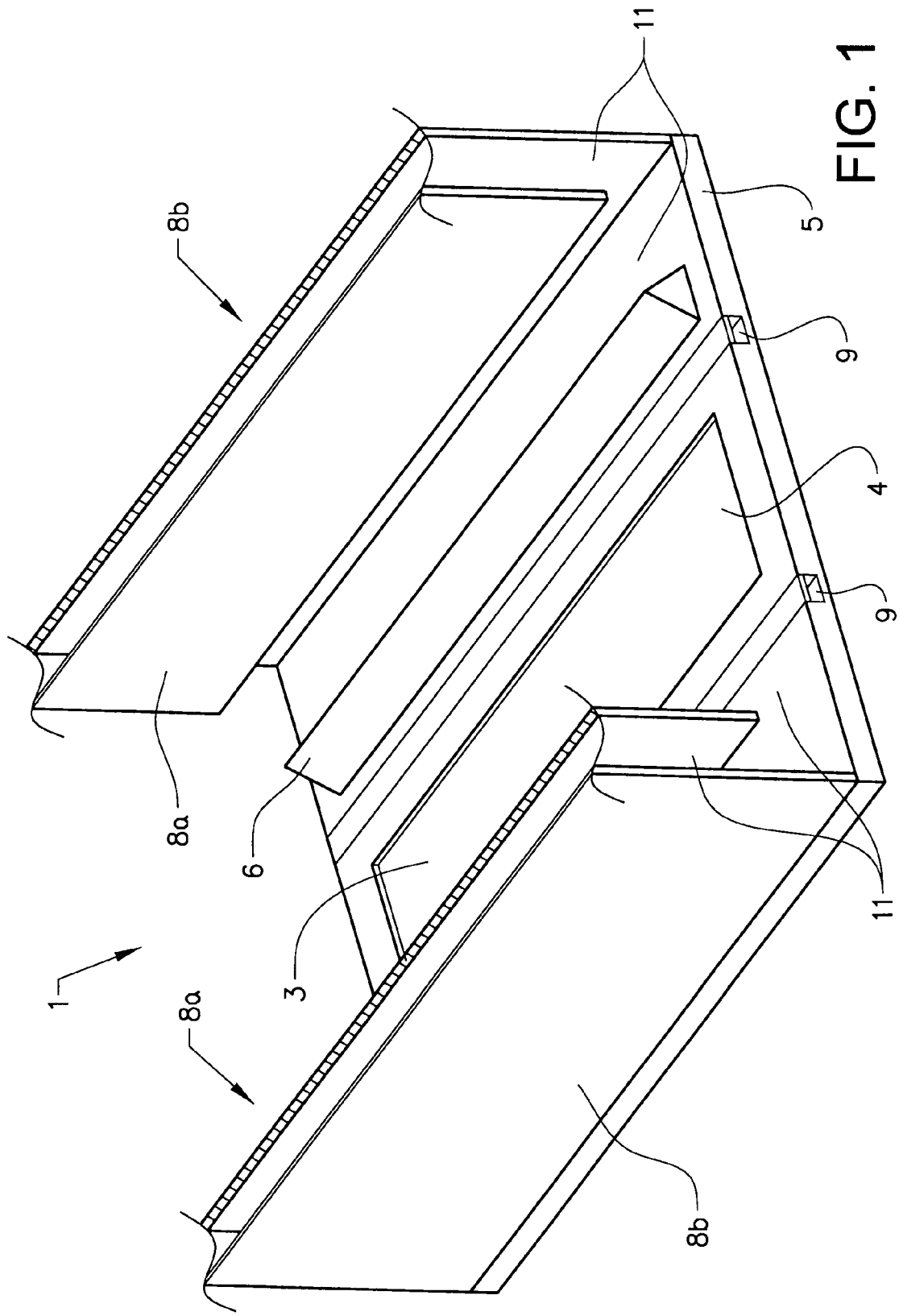
FIG. 1 shows, in a schematic perspective view, a first advantageous embodiment of the invention.

FIGS. 1 and 2 show the components and the function of a first advantageous embodiment of the invention. As shown in these figures the powder application system 1 is arranged on a substantially flat working table 5 and comprises two powder storage units 11 symmetrically arranged on opposite sides of a working area 3 located on top of a vertically adjustable platform 4 that fits into a cut-out in the working table 5. Each powder storage unit 11 is adapted to contain a supply of powder 2 (see FIG. 2A). A distribution member 6 in the form of a rake with a triangular cross section extends along the working area 3 and is arranged by means of guides (not shown) to be moveable across the working area 3 in a direction perpendicular to its direction of extension.

A radiation source (not shown) is preferably arranged at some distance above the working area 3, which working area 3 acts as a target area for the electromagnetic radiation or electron beam used to solidify the powder.

Each powder storage unit 11, together with its corresponding powder supply 2, extends along a side of the working area 3 in a direction substantially parallel to the rake 6. Walls 8a, 8b, together with end walls (not shown), define parts of the powder storage units 11 and keep the supply of powder in place. The powder storage units 11 are arranged in an open manner by letting the walls 8a facing the working area 3 end at a distance above the working table 5. This has the effect that a part of the supply of powder 2 is free to form an angle of repose, $\alpha$, on the side of the powder supply 2 facing the working area 3. This part of the powder supply 2 is indicated by a dashed line and denoted 2b in FIG. 2A. The powder storage units 11 are filled or refilled from above. Powder storage units 11 filled with powder are shown in FIGS. 2A-2D.

Figure 2A:
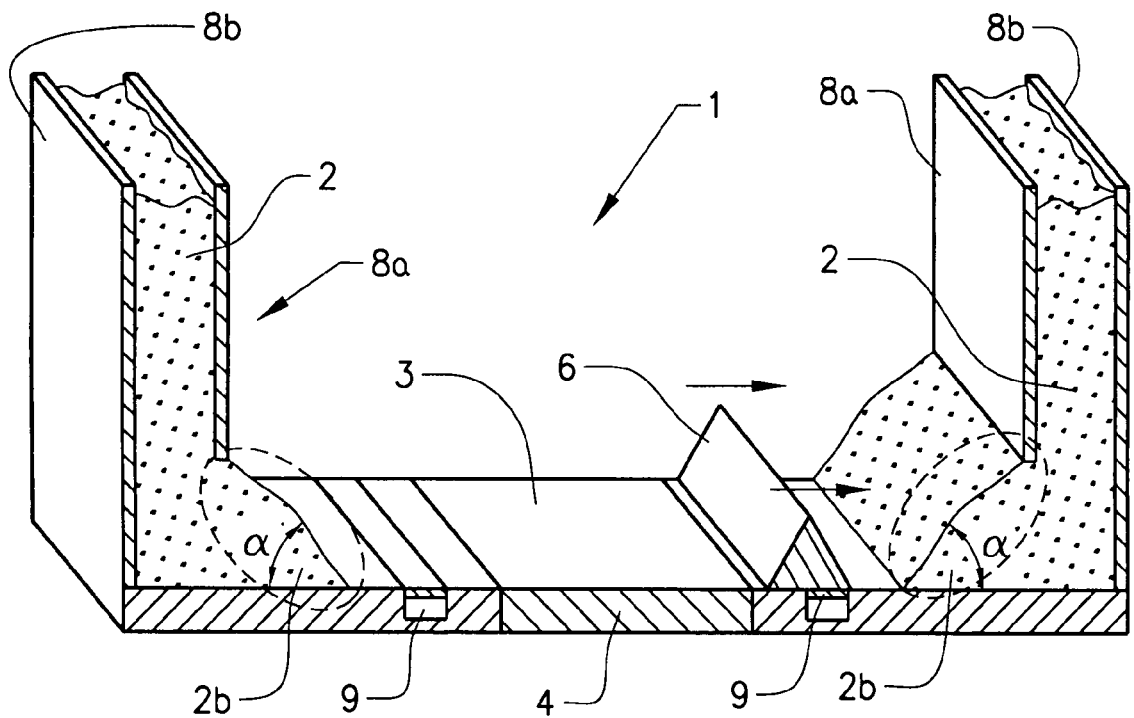
FIG. 2A-2D show, in a schematic perspective sectional view, the function of the first advantageous embodiment of the invention.
Figure 2B:
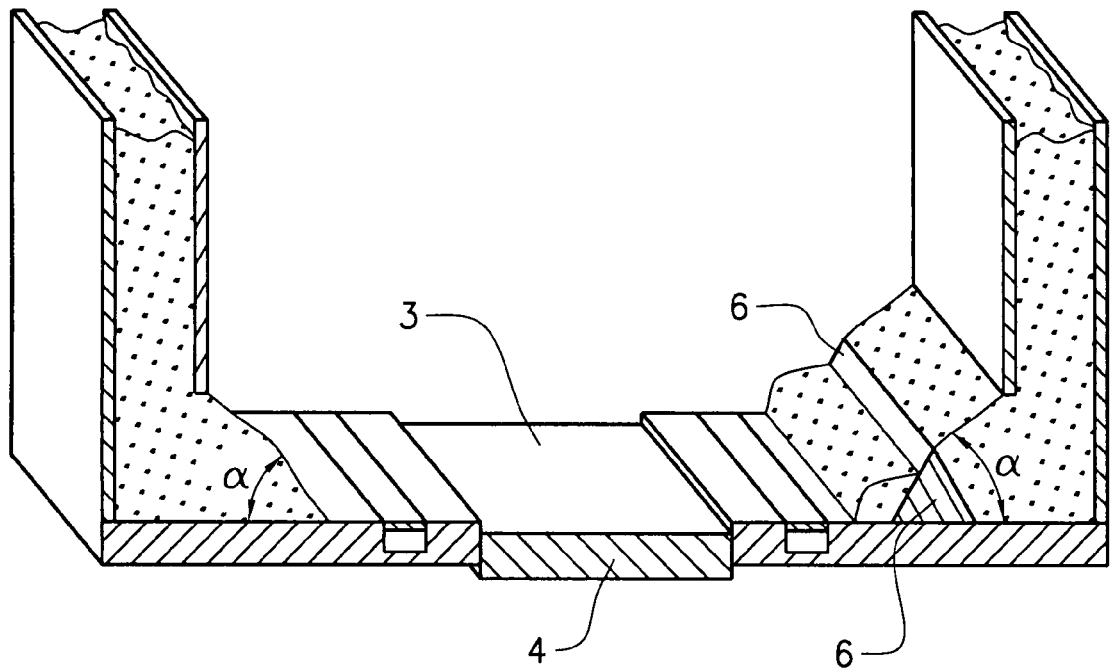
Figure 2C:
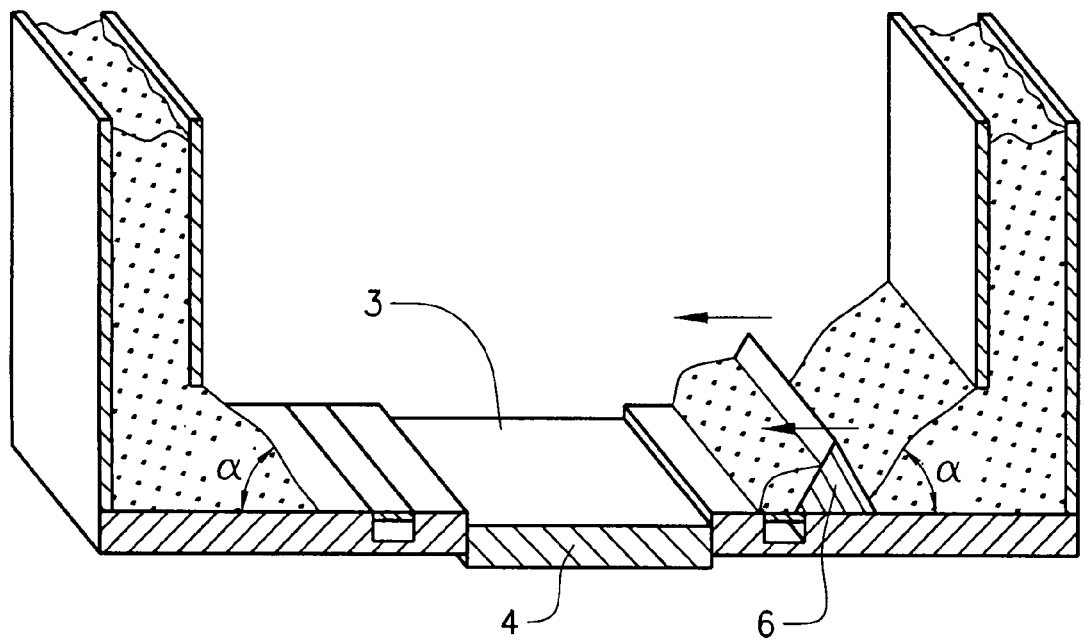
Figure 2D:
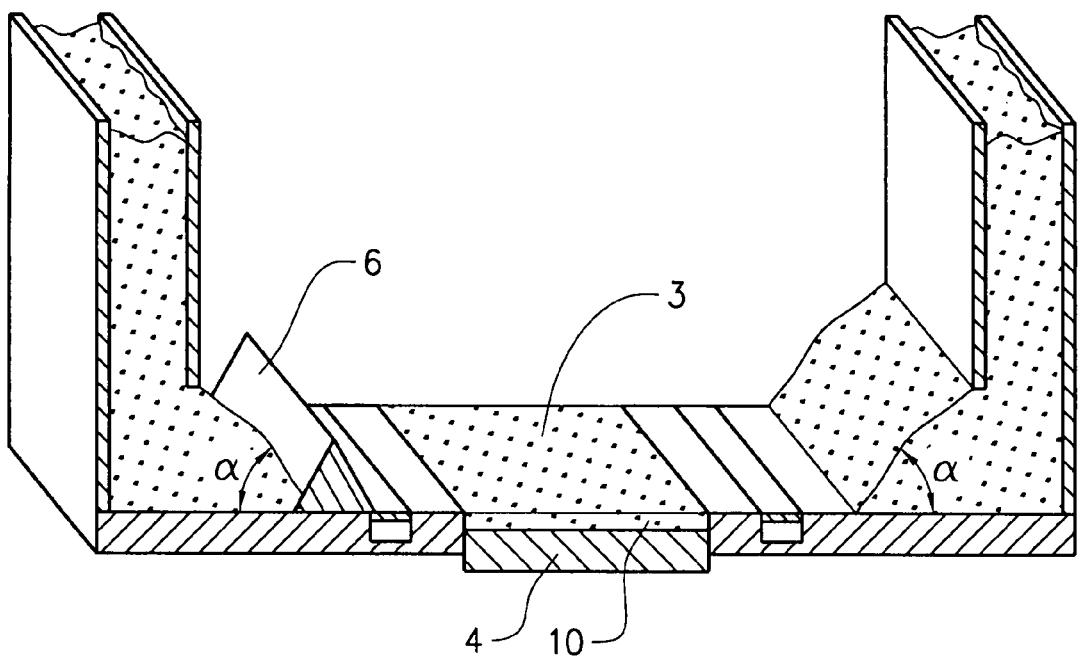

The function of the powder application system 1 will now be described. FIGS. 2A-2D refer to an initial state with regard to the production of a three-dimensional object, i.e. the platform 4 is adjusted to a position slightly below the level of the working table 5 as to facilitate an application of the first layer of powder onto the working area 3. FIG. 2A shows the rake 6 in a first position where it is in motion to the right towards the powder supply 2. In FIG. 2B the rake 6 has reached a second position a predetermined distance into the powder supply 2, i.e. a predetermined distance into the powder storage unit 11. At this position a certain portion of powder has, by the force of gravity, flown over the rake from the powder supply 2 to the side of the rake 6 facing the working area 3. FIG. 2C shows the rake 6 in a similar position as in FIG. 2A but in this case the rake 6 is in motion to the left pushing the portion of powder towards the working area 3. In FIG. 2D the rake 6 is in a fourth position after having passed across the working area 3 onto which a first powder layer 10 now has been applied. At this point the first layer 10 may be solidified by irradiation means.

Preferably, the rake 6 is provided with at least one flexible strip (not shown) that extends along the underside of the rake 6 and that presses slightly upon the working area 3 when the rake 6 moves across it. Such a flexible strip makes it easier to achieve a uniform layer 10. Moreover, this feature makes the powder application system 1 less sensitive to variations in the distance between the working area 3 and the underside of the rake 6 caused by e.g. irregularities in a sintered surface. Such a strip could, for instance, be formed by a thin metal plate.

Further, the system 1 comprises flap doors 9 that can be opened to remove impurities, such as agglomerated powder particles, or excess powder from the working table 5. The flap doors 9 can be opened manually when needed or can be controlled to be automatically opened at a certain interval.

The amount of powder that will flow over the distribution member 6, i.e. the size of the portion of powder to be applied onto the working area 3, is generally dependent on how far the distribution member 6 is moved into the powder supply 2, the speed, shape and surface properties of the distribution member 6, the design of the powder storage unit 11 and the type of powder. The type of powder has an effect on the flow properties of the powder which affects both the magnitude of the angle of repose, $\alpha$, and the amount of powder actually flowing over the distribution member 6.

With the expression form an angle of repose is meant that the boundaries of the powder supply 2, at least in a certain region 2b, are such that the powder is allowed to form a shape that generally is dependent on the internal friction of the powder in question. By arranging the powder storage unit 11 in an at least partly open manner the powder is allowed to form such an angle of repose. In its simplest form the powder storage unit 11 is just an area onto which the powder supply 2 may be positioned. However, in order to keep the powder supply 2 in place and to facilitate refilling of the powder supply and reforming of the angle of repose the powder storage unit 11 preferably comprises limiting members such as the walls 8a and 8b.

The angle of repose, $\alpha$, depends on powder properties, such as type of material, size distribution and particle shape. The shape and position of the part 2b of the powder supply 2 forming an angle of repose, $\alpha$, and possibly also the angle, $\alpha$, itself, can be affected by e.g. varying the design of the powder storage unit 11 by varying the distance between the walls 8a, 8b and/or varying the distance between the working table 5 and the wall 8a facing the working area 3.

The amount of powder needed for each layer, i.e. the required size of the powder portion to be applied onto the working area 3, depends e.g. on the size of the object to be produced. To determine the adequate size of a portion of powder one may, for a given powder and a given distribution member, make a few tests while adjusting the position of the powder supply 2, by varying the height to the wall 8a, and/or adjusting the distance between the platform 4 and the end-position (see FIG. 2B) of the distribution member 6, which end-position is related to the distance the distribution member 6 is moved into the powder supply 2. If another type of powder is to be used this simple testing procedure may be repeated.

It is important that the size of the powder portion is not too small, since this would result in a non-uniform layer thickness. Although the powder application system 1 according to the invention is relatively insensitive to too large powder portions it may lead to difficulties in applying an even layer if, on the other hand, the powder portion is much too large. Preferably, an amount of powder that is slightly larger than required is selected each time. Because i) the system includes only one moving part: the distribution member 6, ii) this moveable part is relatively easy to control thoroughly, and iii) the shape of the powder supply 2 that forms an angle of repose, $\alpha$, reforms in a consistent manner, the powder application system 1 according to the invention is capable of selecting a portion of powder that is very close, to the same size each time.

The powder application system according to the invention is well suited for various metallic, plastic, ceramic or other powdery materials. The term powder should in this context be given a broad interpretation regarding the size or size distribution of the particles present in the powder. The inventive system is applicable to most particle size distributions; a typical particle size may be around 10-100 μm but the particles could be at least one order of magnitude smaller or larger than this range.

The cross section of the distribution member 6 in the preferred embodiment shown in FIGS. 1 and 2 is triangular. However, various cross sections are possible. Generally, a side facing a powder supply 2 should be adapted to be suitable for being moved into the powder supply 2, a side facing the working area 3 should be adapted to be suitable for pushing and distributing the powder, and an upper side should be adapted to be suitable for transfer of powder from one side to another at the time the distribution member 6 is in a position corresponding to FIG. 2B. For instance, the distribution member 6 could be provided with one or several powder passages extending through the member 6 from one side to the other so that powder not necessarily has to pass above the whole member 6 during transfer from the powder supply 2 to the other side of the member 6. In a situation where two powder supplies 2 are used, such as in the embodiment described above, the member 6 is preferably symmetric. However, if two different powder types are used, i.e. one type in each powder supply 2, the distribution member 6 may be asymmetric. The triangular cross section has an advantage in that only small amounts of powder stays on top of the member 6, which may not be the case with e.g. a rectangular cross section.

Preferably, the distribution member 6 is controlled by a control unit (not shown) that suitably is adapted to also control e.g. the beam used to irradiate the powdery material and the vertical position of the platform 4.

The invention is not limited by the embodiments described above, but a number of modifications are possible within the scope of the claims. For instance, two sets of powder supplies 2 and distribution members 6 may be used such that the two distribution members 6 move, one at a time, substantially perpendicular to each other across the working area 3.

The invention claimed is:

1. Powder application apparatus for feeding and distributing a powder over a working area in an apparatus for producing three-dimensional objects, said apparatus comprising:
    a working table with a cutout where a working area is located,
    a powder storage unit adapted to contain a supply of powder and extending along a side of the working area, wherein the unit comprises walls for keeping the supply of powder in place, wherein the unit is arranged in an open manner by letting a wall facing the working area end a distance above the working table such that powder placed in the unit forms an angle of repose on the side of the powder supply facing the working area, and
    a distribution member that is arranged to be moveable across the working area to distribute a portion of powder onto the working area, whereby the member extends substantially parallel to the unit, wherein the distribution member is arranged to be, in a first step, moveable towards the unit such as to reach a position a predetermined distance into a supply of powder, when powder is placed in the unit, said distance being sufficiently long to bring about a transfer of a portion of powder from one side of the distribution member to another side of the distribution member facing the working area, and wherein the distribution member is arranged to be, in a second step, moveable towards and across the working area to distribute the portion of powder onto the working area.

2. The powder application apparatus according to claim 1, wherein the working area is located on a vertically adjustable platform.

3. The powder application apparatus according to claim 1, wherein the apparatus includes a second powder storage unit located on an opposite side of the working area from the powder storage unit.

4. The powder application apparatus according to claim 1, wherein the distribution member has a triangular cross section.

5. The apparatus of claim 1, wherein the distribution member has at least one powder passage extending through the member, and wherein movement of the member a predetermined distance into the powder supply is to transfer powder to the side of the member facing the working area at least in part through the at least one powder passage.

6. A system for producing a three-dimensional object layer by layer using a powdery material which can be solidified by irradiating it with at least one of electromagnetic radiation or an electron beam, the system comprising:
    powder application apparatus including
        a working table with a cutout where a working area is located,
        a powder storage unit adapted to contain a supply of powder and extending along a side of the working area, wherein the unit comprises walls for keeping the supply of powder in place, wherein the unit is arranged in an open manner by letting a wall facing the working area end a distance above the working table such that powder placed in the unit forms an angle of repose on the side of the powder supply facing the working area, and
        a distribution member that is arranged to be moveable across the working area to distribute a portion of powder onto the working area, whereby the member extends substantially parallel to the unit, wherein the distribution member is arranged to be, in a first step, moveable towards the unit such as to reach a position a predetermined distance into a supply of powder, when powder is placed in the unit, said distance being sufficiently long to bring about a transfer of a portion of powder from one side of the distribution member to another side of the distribution member facing the working area, and wherein the distribution member is arranged to be, in a second step, moveable towards and across the working area to distribute the portion of powder onto the working area.

7. The system of claim 6, wherein the working area is located on a vertically adjustable platform.

8. The system of claim 6, wherein the powder storage unit includes a first powder storage located on a first side of the working area and a second powder storage located on a second side of the working area.

9. The system of claim 6, wherein the distribution member has a triangular cross section.

10. The system of claim 6, wherein the distribution member has at least one powder passage extending through the member, and wherein movement of the member a predetermined distance into the powder supply is to transfer powder to the side of the member facing the working area at least in part through the at least one powder passage.

11. A method for applying powder onto a working area in an apparatus for producing three-dimensional objects, said method comprising:
    transferring a portion of powder from a powder supply to a distribution member and moving the distribution member across the working area to distribute the portion of powder onto the working area,
    moving the distribution member a predetermined distance into the powder supply to bring about a transfer of a portion of powder from the powder supply at one side of the distribution member to another side of the distribution member facing the working area, wherein the powder supply extends along a side of the working area and is arranged in an open manner such that the powder forms an angle of repose on the side of the powder supply facing the working area, and wherein the distribution member extends substantially parallel along the powder supply, and moving the distribution member towards and across the working area to distribute the portion of powder onto the working area.

12. The method of claim 11, wherein the working area is located on a vertically adjustable platform within a working table, the method further comprising:

prior to moving the distribution member across the working area, adjusting the platform to a position slightly below the level of the working table.

13. The method of claim 11, wherein the powder storage unit includes a first powder storage located on a first side of the working area and a second powder storage located on a second side of the working area, the method further comprising:

moving the distribution member to transfer a portion of powder from the first powder storage to the working area, and moving the distribution member to transfer a portion of powder from the second powder storage to the working area.

14. The method of claim 13, further comprising:

filling the first powder storage with a first type of powder; and filling the second powder storage with a second type of powder.

15. The method of claim 14, wherein the distribution member has an asymmetric cross section.

16. The method of claim 11, wherein the distribution member has a symmetric cross section.

17. The method of claim 11, wherein the distribution member has at least one powder passage extending through the member, and wherein moving the member a predetermined distance into the powder supply transfers powder to the side of the member facing the working area at least in part through the at least one powder passage.

* * * * *